US012630038B1

(12) United States Patent

Maiwald et al.

(10) Patent No.: US 12,630,038 B1

(45) Date of Patent: May 19, 2026

(54) ADAPTIVE PORTABLE EV CHARGING SYSTEM WITH THERMAL MANAGEMENT AND WI-FI CONNECTIVITY

(71) Applicant: Dropcases, Ltd., Kowloon (HK)

(72) Inventors: Christopher Eckhard Maiwald, Kowloon (HK); German Chan, Kowloon (HK); Wu Chen, Shenzhen City (CN)

( * ) Notice: Subject to any disclaimer, the term of this patent is extended or adjusted under 35 U.S.C. 154(b) by 0 days.

(21) Appl. No.: 19/198,223

(22) Filed: May 5, 2025

(51) Int. Cl.
<table>
<tr><td>B60L 53/63</td><td>(2019.01)</td></tr>
<tr><td>B60L 53/16</td><td>(2019.01)</td></tr>
<tr><td>B60L 53/18</td><td>(2019.01)</td></tr>
<tr><td>B60L 53/68</td><td>(2019.01)</td></tr>
<tr><td>G06F 8/65</td><td>(2018.01)</td></tr>
</table>

(52) U.S. Cl.
CPC ............... B60L 53/63 (2019.02); B60L 53/16 (2019.02); B60L 53/18 (2019.02); B60L 53/68 (2019.02); G06F 8/65 (2013.01)

(58) Field of Classification Search
CPC .......... B60L 53/63; B60L 53/16; B60L 53/18; B60L 53/68; G06F 8/65
See application file for complete search history.

(56) References Cited

U.S. PATENT DOCUMENTS

<table>
<tr><td>2012/0119702 A1*</td><td>5/2012</td><td>Gaul</td><td>........................</td><td>B60L 53/16</td></tr>
<tr><td></td><td></td><td></td><td></td><td>439/620.21</td></tr>
<tr><td>2013/0201641 A1*</td><td>8/2013</td><td>Soden</td><td>.....................</td><td>B60L 58/25</td></tr>
<tr><td></td><td></td><td></td><td></td><td>361/752</td></tr>
<tr><td>2018/0001776 A1*</td><td>1/2018</td><td>Kim</td><td>.........................</td><td>B60L 53/14</td></tr>
<tr><td>2022/0032794 A1*</td><td>2/2022</td><td>Lee</td><td>..........................</td><td>B60L 53/66</td></tr>
<tr><td>2022/0194236 A1*</td><td>6/2022</td><td>Whiting</td><td>..................</td><td>B60L 53/64</td></tr>
</table>

* cited by examiner

*Primary Examiner* — David V Henze-Gongola

(74) *Attorney, Agent, or Firm* — BOAG LAW, PLLC

(57) ABSTRACT

A portable electric vehicle charger with adjustable current provides a versatile, safe, and efficient charging solution for electric vehicles. Intermittent current control and protection device (IC-CPD) automatically detect input voltage and adjusts charging currents for both Level 1 (120V) and Level 2 (240V) power sources. Embodiments include interchangeable NEMA plug cables for flexible use, supporting current adjustments from 8 A to 40 A. A temperature sensor may monitor the charging process, reducing current to prevent overheating and automatically resuming once safe conditions are restored. Wi-Fi connectivity provides remotely control and monitor charging via a mobile app.

1 Claim, 3 Drawing Sheets

ADAPTIVE PORTABLE EV CHARGING SYSTEM WITH THERMAL MANAGEMENT AND WI-FI CONNECTIVITY

BACKGROUND

The rapid adoption of electric vehicles (EVs) has created an increasing demand for flexible and efficient charging solutions. Traditional EV chargers are often limited in adaptability, requiring separate devices for Level 1 (120V) and Level 2 (240V) charging, leading to inconvenience and additional costs for users. Many existing chargers lack adjustable current settings, forcing users to charge at fixed power levels, which may not be compatible with their home electrical systems or vehicle battery capacity. Furthermore, most chargers require complex installations, making them unsuitable for users who need a portable and easily deployable charging solution.

Another critical challenge in EV charging is temperature regulation and electrical safety. Overheating of charging cables and plugs is a common issue, especially when using higher current levels in Level 2 charging. Existing chargers often lack real-time thermal monitoring and automatic power adjustment features, leading to potential safety hazards such as electrical fires, circuit overloads, and long-term battery damage. Additionally, many chargers do not provide real-time feedback or remote-control capabilities, requiring users to manually monitor and adjust charging, which is inconvenient and inefficient.

The charger disclosed herein addresses these challenges by offering a versatile, intelligent, and safety-enhanced charging solution. With its replaceable plug system, it allows users to switch between Level 1 and Level 2 charging effortlessly. The adjustable current settings (8 A-40 A) prevent electrical overloads and optimize charging based on available power and vehicle requirements. Its IC-CPD function box intelligently detects plug types, ensuring automatic and safe power adjustments. Moreover, the inclusion of wireless remote monitoring and real-time temperature control enhances user convenience and prevents overheating, making it an ideal charging solution for modern EV owners.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An embodiment of the present invention relates to a portable electric vehicle charger is designed to accommodate both residential and commercial charging needs. The Level 1 mode operates with a standard NEMA 5-15 plug (120V), while the Level 2 mode uses a NEMA 14-50 plug (240V), delivering a higher charging power.

Yet another embodiment of the present invention is the charger includes a user-friendly interface, allowing users to select their desired charging current by tapping a touch button on the IC-CPD function box. This feature makes it easy to switch between different current levels, preventing overload and ensuring compatibility with various electrical installations. The system is designed for plug-and-play operation, making it accessible even for users with minimal technical knowledge.

Yet another embodiment of the present invention is the process of charging, users need to select the appropriate NEMA plug cable and insert it into the IC-CPD function box. After plugging the charger into the wall socket, the user can adjust the charging current as needed before connecting the charger handle to the EV. Once the setup is complete, the charging process starts automatically, providing a seamless experience.

In another embodiment, for Level 1 charging, when the user connects the NEMA 5-15 cable to the IC-CPD, the default charging current is set to 12 A. However, the user can reduce it to 8 A before starting the charging process. This feature enhances compatibility with household circuits and helps prevent electrical overload.

In another embodiment, for Level 2 charging, when the user connects the NEMA 14-50 cable to the IC-CPD, the default charging current is set to 40 A. Users can manually adjust the current to 16 A, 24 A, or 32 A before plugging the charger handle into the EV. This flexibility allows users to optimize charging power based on available electrical capacity and vehicle specifications.

In another embodiment, the IC-CPD unit detects whether the charger is operating in Level 1 or Level 2 mode by identifying different resistance values in the NEMA plug. Based on this detection, the software automatically sets the default charging current, minimizing the need for manual adjustments while enhancing safety and efficiency.

Yet another embodiment of the invention is temperature monitoring, which helps prevent overheating during charging. The system continuously senses the temperature of the NEMA 14-50 plug, and if it reaches 85° C., the charging power is automatically reduced from 40 A to 32 A. If the temperature continues to rise, further reductions occur, decreasing the charging power to 24 A to prevent overheating.

Yet another embodiment of the present invention includes two temperature sensors for enhanced safety and monitoring. One sensor is integrated within the ICCPD functional box to detect its internal temperature, while the other is embedded in the NEMA 14-50 plug to monitor potential overheating.

Yet another embodiment of the present invention is the temperature sensor present within the ICCPD functional box and is responsible for monitoring the internal temperature of the ICCPD. If the internal temperature reaches a predefined threshold, the sensor transmits this information to the MCU, which promptly halts the charging process to ensure safety and prevent overheating.

In another embodiment, if the temperature exceeds 100° C., charging immediately stops, and an error notification is triggered to prevent potential damage to the charger, vehicle, or electrical system. Once the temperature returns to a safe level, charging automatically resumes at the previously set power level. This temperature-controlled adjustment enhances safety and extends the lifespan of the charger and connected components.

In another embodiment, the charger includes Wi-Fi connectivity, allowing users to remotely adjust the charging current through a mobile application. This feature provides added convenience, enabling users to monitor and control the charging process from a distance.

In another embodiment, the charger features physical adjustment buttons, offering users an alternative way to modify charging settings without relying on a mobile connection. This dual-control approach ensures users can manage their charging preferences even in areas with poor internet connectivity.

BRIEF DESCRIPTION OF THE DRAWINGS

The features and advantages of the present disclosure will be more fully understood with reference to the following detailed description when taken in conjunction with the accompanying figures, wherein.

DETAILED DESCRIPTION

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The portable electric vehicle charger is a versatile charging solution designed to accommodate various electric vehicle (EV) charging needs. The charger includes a replaceable NEMA plug cable system, allowing the user to easily swap between different plugs, such as NEMA 5-15 and NEMA 14-50, the charger supports Level 1 (120V, 8 A-12 A) and Level 2 (240V, 16 A-40 A) depending on the available electrical outlets. The IC-CPD (function box) is the central component that houses the microcontroller unit (MCU) and other necessary electronics. This unit recognizes the type of plug inserted based on its resistance values, adjusting the system's current settings automatically. The charging ports may connect to the vehicle's battery, while the temperature sensor (NTC thermistor) actively monitors the system's temperature, ensuring safe operation by regulating the charging current based on thermal feedback.

A touch-button interface is a user-friendly feature that allows the user to manually adjust the charging current from 8 A to 40 A. This interface ensures simple selection of the desired power level, allowing for efficient and customized charging. Additionally, the Wi-Fi connectivity enables remote control, allowing users to adjust the charging current from a smartphone or another device. This feature provides flexibility and convenience, especially when the charger is not in close proximity to the user. The NTC thermistor continuously monitors the temperature of the system, and when the temperature reaches critical thresholds, the system reduces the current to prevent overheating. If the temperature continues to rise, the charging power is further reduced, and if it exceeds a critical value, the system will stop charging and issue an error message. The charger's plug compatibility and current adjustment system ensures that the correct current is delivered based on the plug type.

For example, with the NEMA 5-15 plug, the charger defaults to 12 A, while the NEMA 14-50 plug can handle 40 A, but users have the flexibility to adjust this within a set range depending on their specific charging requirements. The charging process setup and current selection involves selecting the desired current level using the touch interface or through Wi-Fi, ensuring the user has control over the charging speed and safety at all times.

Figure 1:
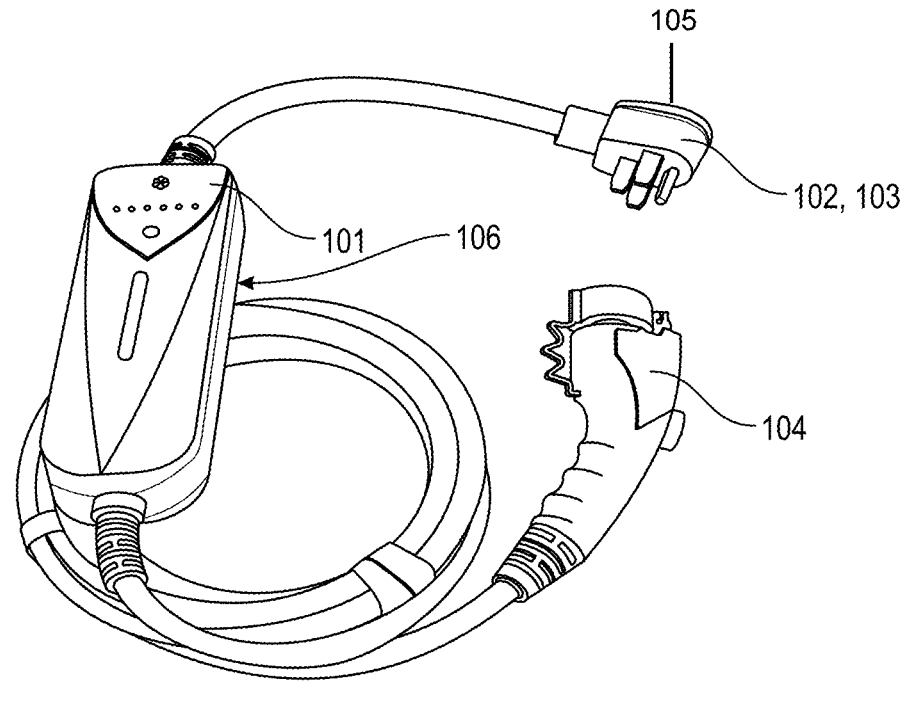
FIG. 1 depicts a system overview with block diagram showing the IC-CPD function box (101), NEMA plug cables (102, 103), charging handle (104), temperature sensor (105), and wireless module (106).

The components of an exemplary portable electric vehicle charger system are as follows:

System Overview (FIG. 1)

Referring to FIG. 1, a portable electric vehicle (EV) charger with adjustable current is disclosed. The charger is a multi-functional charging device configured to provide flexibility, safety, and efficiency in EV charging. The charger is operable in both Level 1 (120V) and Level 2 (240V) charging modes, selectable based on the connected NEMA plug. The device includes adjustable current settings, temperature monitoring, and wireless connectivity to enhance user control and operational safety. The charger comprises an IC-CPD function box (101), interchangeable NEMA plug cables (102, 103), a charging handle (104), a temperature sensor (105), and a wireless module (106).

IC-CPD (Function Box) (101)—the Core Charging Unit

An intermittent current control and protection device (IC-CPD) (101) functions as the central control unit of the charger. The IC-CPD is configured to regulate the charging current, monitor safety parameters, and communicate with external control systems. The IC-CPD detects the connected NEMA plug (102 or 103) and automatically sets the default charging current based on the detected plug type. Additionally, the IC-CPD enables users to manually adjust the charging current, ensuring compatibility with various power sources and electric vehicle models. The IC-CPD further includes a touch button interface, allowing user interaction without the need for additional external hardware.

Another embodiment of the present invention is one sensor is located within the ICCPD functional box and is responsible for monitoring the internal temperature of the ICCPD. If the internal temperature reaches a predefined threshold, the sensor transmits this information to the MCU, which promptly halts the charging process to ensure safety and prevent overheating NEMA 5-15 Plug Cable (Level 1 Charging) (102)—Standard Outlets The NEMA 5-15 plug cable (102) is used for Level 1 charging, which operates at 120V. This plug is designed for standard household wall sockets, making it suitable for users who do not have access to high-power charging stations. By default, the charging current is set to 12 A, but the user can manually reduce it to 8 A if needed. This feature ensures that the device remains compatible with household circuits and prevents overloading electrical outlets.

NEMA 14-50 Plug Cable (Level 2 Charging) (103)—for Faster Charging

The NEMA 14-50 plug cable (103) supports Level 2 charging, which operates at 240V. This plug is commonly found in dedicated EV charging stations, garages, and commercial charging setups. By default, the charging current is set to 40 A, but the user can adjust it to 32 A, 24 A, or 16 A depending on power availability and vehicle requirements. The ability to modify current settings provides greater flexibility, reduces energy consumption, and ensures compatibility with various EV battery capacities.

Charging Handle (104)—Connecting to the Electric Vehicle

The charging handle (104) is the connector that links the charger to the EV's charging port. It is designed to be durable, heat-resistant, and compatible with industry-standard EV sockets. The handle ensures a secure connection between the charger and the vehicle, enabling efficient power transfer. Additionally, the IC-CPD (101) verifies the connection before allowing current to flow, preventing accidental electrical hazards.

Figure 2:
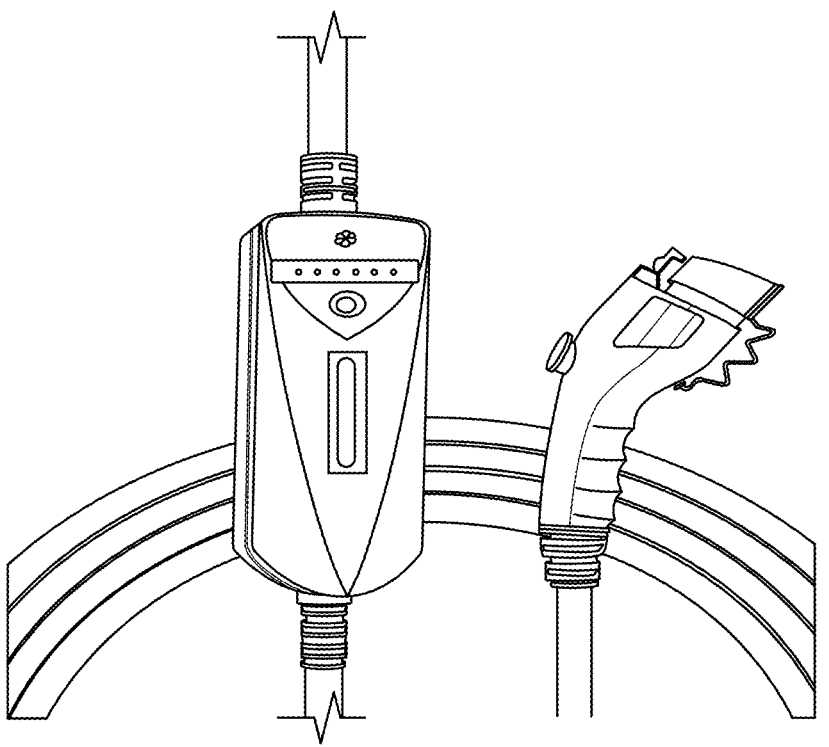
FIG. 2 depicts a simplified sequence diagram illustrating plug selection, power connection, current adjustment, and EV charging initiation.

Step-by-Step Charging Process (Refer to FIG. 2)

To start charging, the user must first select the appropriate NEMA plug cable (102 or 103) based on the available power source. Once the plug is inserted into the IC-CPD (101) and connected to a wall socket, the user taps the touch button twice to initiate setup. They can then select the desired charging current before plugging the charging handle (104) into the EV. After a successful connection, the system automatically begins the charging process, ensuring seamless and efficient operation.

Adjustable Current Feature

Figure 3:
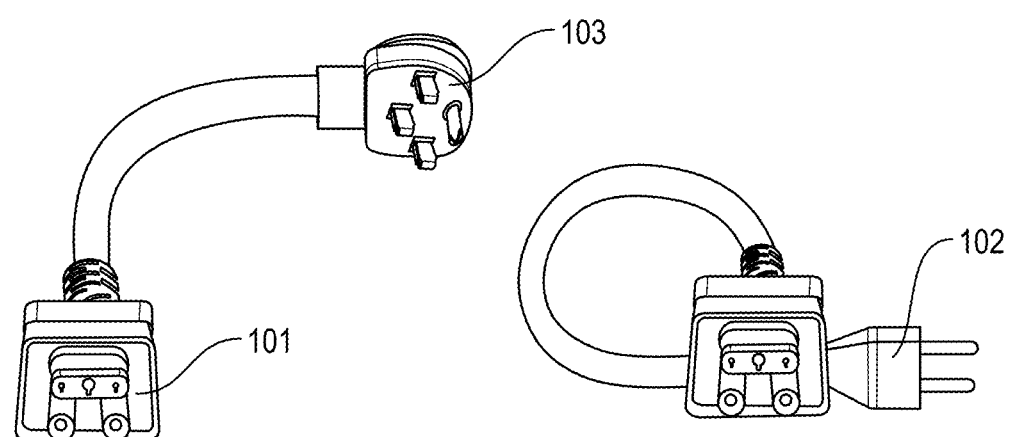
FIG. 3 depicts a schematic showing the user-selectable charging current range for NEMA 5-15 (102) and NEMA 14-50 (103), with automatic resistance detection by IC-CPD (101).

Referring to FIG. 3, the ability to adjust the charging current is described. When using the NEMA 5-15 plug (102), the default current is 12 A, but users can reduce it to 8 A for compatibility with lower-power circuits. In contrast, the NEMA 14-50 plug (103) allows current settings of 16 A, 24 A, 32 A, or 40 A, making it suitable for faster charging while maintaining safety. The IC-CPD (101) automatically detects the resistance values in the plug and sets the default charging current accordingly.

Temperature Monitoring and Power Adjustment

Figure 4:
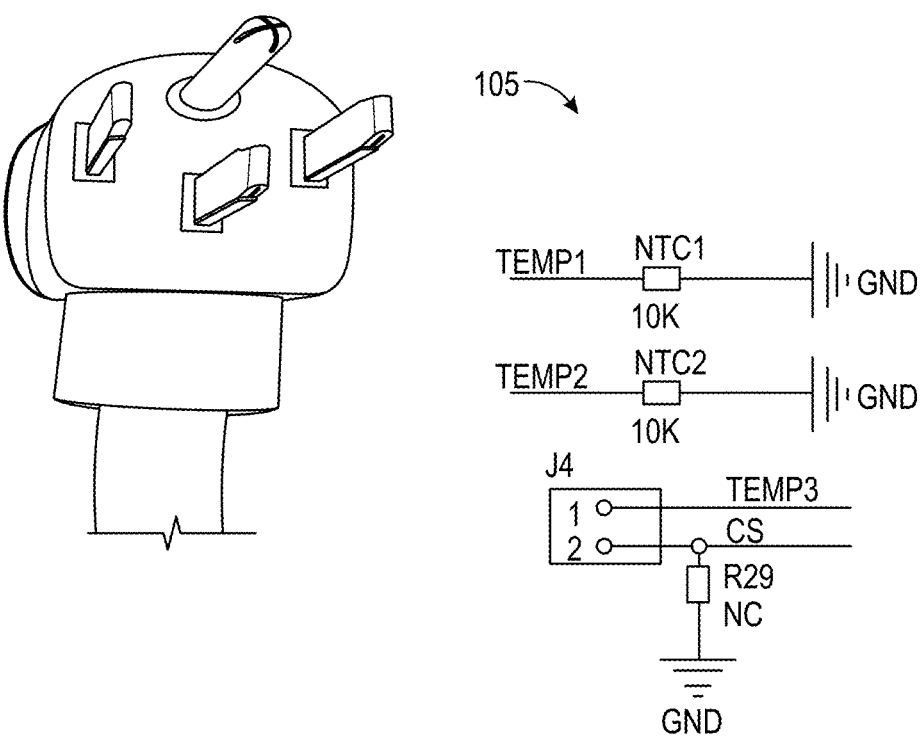
FIG. 4 depicts a diagram showing power reduction at 85° C., further reduction at 100° C., and charging resumption at 65° C. based on temperature sensor (105).

Referring to FIG. 4, to prevent overheating and electrical hazards, the charger may include a temperature sensor (105) that continuously monitors the temperature at the NEMA 14-50 plug (103). Another embodiment of the present invention incorporates a temperature sensor within the NEMA 14-50 plug, is the second temperature sensor. This sensor continuously monitors the plug's temperature to detect potential overheating. If the temperature exceeds a predefined limit, the system can take preventive measures to enhance safety and reliability. If the temperature reaches 85° C., the system automatically reduces the charging power from 40 A to 32 A. If the temperature rises further, additional reductions occur, lowering the power to 24 A to maintain safe operation. If the temperature exceeds 100° C., the charging process is immediately halted, and an error notification is triggered. Once the temperature drops back to 65° C., charging resumes automatically at the previously set power level. This feature significantly enhances safety and prolongs the lifespan of the charger and EV battery.

Wireless Remote Control

Figure 5:
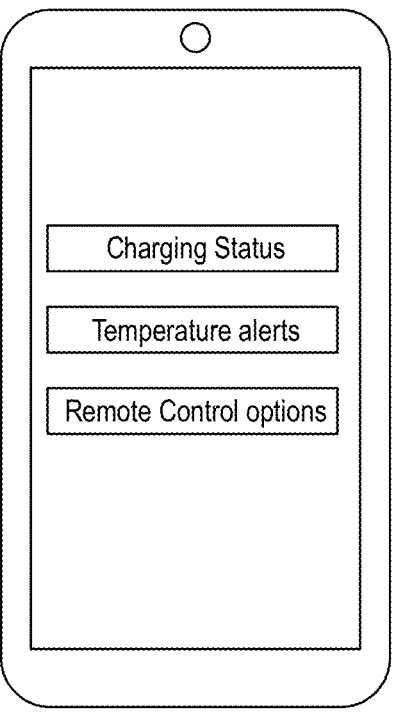
FIG. 5 depicts a basic diagram showing a smartphone app interface with charging status, temperature alerts, and remote-control options.

Referring to FIG. 5, a wireless module (106) may enable users to control and monitor the charging process remotely via a smartphone app. This feature may allow users to, for example, adjust charging current settings without being physically near the charger; receive real-time temperature alerts to prevent overheating; monitor charging progress and estimated completion time; or stop or start charging remotely for added convenience.

This smart control functionality enhances the user experience by providing real-time status updates and remote accessibility.

Plug-and-Play Design for Convenience

A major advantage of embodiments of the invention is its plug-and-play functionality. Unlike traditional EV chargers that require complex installations, this portable charger can be used immediately after plugging into a wall outlet. The interchangeable NEMA plug cables (102 and 103) allow the charger to be used in various locations, eliminating the need for multiple charging devices. This feature makes it particularly useful for travelers, apartment dwellers, and users with different charging needs.

Safety Features and Error Handling

Embodiments of the invention are designed to provide reliable and secure operation under various conditions. The charger is equipped with multiple advanced protection mechanisms to mitigate potential hazards and enhance user confidence. These include an automatic power reduction feature that activates when excessive heat is detected, preventing thermal damage and prolonging the lifespan of the device. Additionally, an overload protection system safeguards the circuitry by limiting excessive current flow, thereby reducing the risk of component failure. To further enhance operational safety, short-circuit prevention mechanisms are implemented, minimizing the likelihood of electrical faults that could compromise functionality. In the event of any detected issues, the charger provides real-time error alerts via Wi-Fi, enabling users to take prompt corrective action and ensuring uninterrupted performance.

These safety measures ensure that the charging process remains reliable and secure under various conditions.

Compatibility with Various EV Models

The charging handle (104) and adjustable current settings ensure compatibility with multiple electric vehicle brands and models. Whether an electric vehicle supports Level 1 slow charging or Level 2 fast charging, this charger can be customized accordingly. This flexibility makes it a cost-effective and practical solution for a broad range of electric vehicle users.

Example 2: Mechanism of Working

The portable electric vehicle charger with adjustable current operates as a highly integrated system, where each component functions synergistically to provide a safe, efficient, and user-friendly charging experience. The charger's IC-CPD function box (101) acts as the central processing unit, intelligently detecting input voltage, resistance values, and user-defined settings to regulate the charging current. This coordination between hardware and software ensures that the charger automatically adjusts power levels based on the plug type (102 or 103) and the selected settings, reducing the risk of overloading or damaging electrical circuits.

An interchangeable NEMA plug cable system is provided, which allows users to switch between Level 1 (120V) and Level 2 (240V) charging seamlessly. When the NEMA 5-15 plug (102) is inserted into the IC-CPD, the system defaults to 12 A charging, but the user can reduce it to 8 A if needed. Similarly, when the NEMA 14-50 plug (103) is used, the default setting is 40 A, but users can lower it to 32 A, 24 A, or 16 A. This smart current adjustment mechanism ensures compatibility with different power sources and prevents excessive strain on electrical outlets, demonstrating an adaptive approach to power management.

The charging handle (104) may establish a secure and efficient connection between the charger and the EV. Once the charger is plugged into the EV, the IC-CPD verifies the connection before initiating power transfer. This prevents unintended short circuits or faulty charging sessions. Additionally, the user-friendly touch button interface on the IC-CPD allows users to select the desired charging current, further reinforcing the interactive and intuitive nature of the system.

In an embodiment of the invention, a temperature monitoring mechanism (105), works dynamically with the IC-CPD (101) to prevent overheating and ensure safety. The system continuously monitors the temperature at the NEMA 14-50 plug (103) and makes real-time adjustments to the charging power. If the temperature reaches 85° C., the power is automatically reduced from 40 A to 32 A. If the temperature continues to rise, the charging current is further lowered to 24 A. In extreme cases where the temperature exceeds 100° C., charging is immediately stopped, and an error alert is issued. Once the temperature drops to 65° C., the system resumes charging at the previously set current level. This self-regulating thermal management system ensures long-term durability and reliability of the charger.

The wireless module (106) further enhances the charger's synergy by enabling remote monitoring and control. Users can adjust charging current, receive temperature alerts, and track charging progress from a smartphone app, eliminating the need for constant physical supervision. The integration of IoT technology allows the charger to be part of a smart charging ecosystem, where users can schedule charging sessions, optimize power consumption, and receive automated safety warnings. This connectivity bridges the gap between convenience and safety, making the charger an essential tool for modern EV users.

An error handling system may work in tandem with other components to ensure maximum protection against faults. If there is a short circuit, overheating, or unexpected power surge, the IC-CPD immediately stops charging and triggers an error notification through the wireless module (106). This layered safety architecture prevents damage to the vehicle's battery, the charger itself, and the household electrical system.

The plug-and-play design of this charger ensures maximum portability and user convenience. Unlike traditional electric vehicle chargers that require complex installations, this device can be easily transported and used in different locations by simply swapping the plug type (102 or 103). This feature is particularly beneficial for EV owners who travel frequently or need a flexible charging solution for multiple locations.

While emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

We claim:

1. A portable electric vehicle charger with adjustable current, comprising:

a) an intermittent current control and protection device (IC-CPD) (101) configured to regulate charging current, detect input voltage, and ensure safety features;

b) a first interchangeable plug cable (102) configured for level 1 charging via a NEMA 5-15 plug, supporting an adjustable charging current between 8 A and 12 A;

c) a second interchangeable plug cable (103) configured for level 2 charging via a NEMA 14-50 plug, supporting an adjustable charging current between 16 A and 40 A;

d) a charging handle (104) operably connected to the IC-CPD (101), facilitating secure connection between the charger and the EV;

e) a temperature sensor (105) configured to monitor charging plug temperature and dynamically adjust charging current to prevent overheating;

f) a wireless transceiver (106) configured to allow remote control and monitoring of the charging process via a mobile application; and g) wherein the IC-CPD (101) is further configured to detect the resistance values of the inserted plug (102, 103) and set a default charging current accordingly, with user-adjustable settings available through a touch button interface or the wireless transceiver (106), and wherein the IC-CPD (101) automatically adjusts charging power in response to temperature variations detected by the temperature sensor (105), such that: (i) at 85° C., the charging power is reduced from 40 A to 32 A; (ii) at 100° C., charging is immediately stopped; and (iii) at 65° C., charging resumes at the previously set current level.

* * * * *